United States Patent
Nakajima et al.

(10) Patent No.: US 11,267,432 B2
(45) Date of Patent: Mar. 8, 2022

(54) AIRBAG

(71) Applicant: Autoliv Development AB, Vargarda (SE)

(72) Inventors: Yutaka Nakajima, Kanagawa (JP);
Takanari Muroya, Kanagawa (JP);
Ryota Ishigaki, Kanagawa (JP)

(73) Assignee: Autoliv Deveopment AB, Vargarda (SE)

( * ) Notice: Subject to any disclaimer, the term of this patent is extended or adjusted under 35 U.S.C. 154(b) by 68 days.

(21) Appl. No.: 16/525,754

(22) Filed: Jul. 30, 2019

(65) Prior Publication Data
US 2020/0031306 A1    Jan. 30, 2020

(30) Foreign Application Priority Data

Jul. 30, 2018 (JP) .............................. JP2018-142498
Jun. 21, 2019 (JP) .............................. JP2019-115776

(51) Int. Cl.
*B60R 21/233* (2006.01)
*B60R 21/2338* (2011.01)
(Continued)

(52) U.S. Cl.
CPC .......... *B60R 21/233* (2013.01); *B60R 21/239* (2013.01); *B60R 21/2338* (2013.01);
(Continued)

(58) Field of Classification Search
CPC .... B60R 2021/0009; B60R 2021/0023; B60R 2021/0048; B60R 2021/23308;
(Continued)

(56) References Cited

U.S. PATENT DOCUMENTS 3,752,501 A * 8/1973 Daniel .................. B60R 21/261
280/729
5,464,246 A 11/1995 Castro et al.
(Continued)

FOREIGN PATENT DOCUMENTS

DE        19841347 A1    3/2000
JP        2008018936     1/2008
(Continued)

OTHER PUBLICATIONS

"Headrest with integrated inflatable airbag curtain", Research Disclosure database No. 608032, Published digitally Nov. 14, 2014.
(Continued)

*Primary Examiner* — Laura Freedman
(74) *Attorney, Agent, or Firm* — Stoel Rives LLP

(57) ABSTRACT

An airbag that includes an inner bag having a facing surface configured to face a passenger of a vehicle in the deployed state, an outer bag that surrounds the outer periphery of the inner bag with the facing surface exposed, and two protrusion parts which are provided in the outer bag and are respectively disposed on the left and right sides in the width direction of the vehicle with respect to the facing surface so as to protrude rearward. The inner bag and the outer bag may be partitioned by a common partition wall, with a ventilation port formed in the partition wall. Moreover, the inner bag and the outer bag may each be independent bag bodies, a ventilation port may be formed in both the inner bag and the outer bag, and the inner bag and the outer bag may be coupled around the ventilation port.

13 Claims, 16 Drawing Sheets

(51) Int. Cl.
*B60R 21/239* (2006.01)
*B60R 21/00* (2006.01)
*B60R 21/205* (2011.01)

(52) U.S. Cl.
CPC ..... *B60R 21/205* (2013.01); *B60R 2021/0048* (2013.01); *B60R 2021/2395* (2013.01); *B60R 2021/23308* (2013.01); *B60R 2021/23324* (2013.01); *B60R 2021/23382* (2013.01)

(58) Field of Classification Search
CPC ........... B60R 2021/23324; B60R 2021/23332; B60R 2021/23382; B60R 2021/2395; B60R 21/205; B60R 21/233; B60R 21/2338; B60R 21/239
See application file for complete search history.

(56) References Cited

U.S. PATENT DOCUMENTS

| | | | |
|---|---|---|---|
| 5,556,129 A | 9/1996 | Coman et al. | |
| 5,839,753 A | 11/1998 | Yaniv et al. | |
| 6,050,635 A | 4/2000 | Pajon et al. | |
| 6,237,945 B1 | 5/2001 | Aboud et al. | |
| 6,254,121 B1* | 7/2001 | Fowler | B60R 21/233 |
| | | | 280/729 |
| 6,308,982 B1 | 10/2001 | Wallner et al. | |
| 6,715,778 B2 | 4/2004 | Gottschalk et al. | |
| 6,715,788 B2 | 4/2004 | Saiguchi et al. | |
| 7,481,452 B2 | 1/2009 | Itoga et al. | |
| 7,673,901 B2* | 3/2010 | Hanawa | B60R 21/233 |
| | | | 280/743.1 |
| 7,681,909 B2* | 3/2010 | Idomoto | B60R 21/2346 |
| | | | 280/729 |
| 7,926,840 B1* | 4/2011 | Choi | B60R 21/214 |
| | | | 280/730.1 |
| 8,007,001 B2 | 8/2011 | Lin | |
| 8,393,637 B2* | 3/2013 | Choi | B60R 21/231 |
| | | | 280/730.1 |
| 8,439,395 B2* | 5/2013 | Nagai | B60R 21/2346 |
| | | | 280/729 |
| 8,579,321 B2* | 11/2013 | Lee | B60R 21/233 |
| | | | 280/729 |
| 9,561,774 B2* | 2/2017 | Cheng | B60R 21/239 |
| 9,623,831 B1* | 4/2017 | Deng | B60R 21/01 |
| 9,663,060 B1* | 5/2017 | Deng | B60R 21/205 |
| 9,676,355 B2* | 6/2017 | Kruse | B60R 21/0132 |
| 9,694,782 B2* | 7/2017 | Nagatani | B60R 21/2338 |
| 9,827,939 B1* | 11/2017 | Roychoudhury | B60R 21/233 |
| 10,155,496 B2* | 12/2018 | Faruque | B60R 21/233 |
| 10,183,645 B2* | 1/2019 | Rose | B60R 21/01552 |
| 10,293,775 B2* | 5/2019 | Wang | B60R 21/205 |
| 10,315,610 B2* | 6/2019 | Moritani | B60R 21/233 |
| 10,391,968 B2* | 8/2019 | Jaradi | B60R 21/231 |
| 10,427,638 B2* | 10/2019 | Choi | B60R 21/233 |
| 10,654,439 B2* | 5/2020 | Kitagawa | B60R 21/2334 |
| 10,836,343 B2* | 11/2020 | Nakajima | B60R 21/203 |
| 10,953,837 B2* | 3/2021 | Arima | B60R 21/264 |
| 2009/0061675 A1 | 3/2009 | Chen | |
| 2009/0066063 A1 | 3/2009 | Mical | |
| 2011/0148081 A1 | 6/2011 | Smith et al. | |
| 2012/0038137 A1 | 2/2012 | Wipasuramonton et al. | |
| 2013/0009391 A1 | 1/2013 | Miller et al. | |
| 2014/0300088 A1 | 10/2014 | Fukawatase | |
| 2015/0091278 A1 | 4/2015 | Yasuoka | |
| 2015/0259071 A1 | 9/2015 | Santana-Gallego et al. | |
| 2015/0329076 A1 | 11/2015 | Biller et al. | |
| 2016/0280171 A1 | 9/2016 | Moeller et al. | |
| 2017/0355344 A1 | 12/2017 | Choi et al. | |
| 2018/0118150 A1 | 5/2018 | Kwon | |
| 2018/0326938 A1 | 11/2018 | Rickenbach et al. | |
| 2018/0326940 A1 | 11/2018 | Faruque et al. | |
| 2018/0339776 A1 | 11/2018 | Hainsworth et al. | |
| 2019/0016288 A1 | 1/2019 | Schneider et al. | |
| 2019/0016293 A1 | 1/2019 | Saso | |
| 2019/0061675 A1 | 2/2019 | Kwon | |
| 2019/0092271 A1 | 3/2019 | Park et al. | |
| 2019/0161050 A1 | 5/2019 | Schneider | |
| 2019/0176739 A1 | 6/2019 | Song | |
| 2019/0176744 A1 | 6/2019 | Yoo et al. | |
| 2019/0248322 A1 | 8/2019 | Herzenstiel et al. | |
| 2019/0248323 A1 | 8/2019 | Saito et al. | |
| 2019/0283700 A1 | 9/2019 | Kwon | |
| 2019/0283702 A1* | 9/2019 | Yamada | B60R 21/233 |
| 2019/0291681 A1* | 9/2019 | Nakajima | B60R 21/216 |
| 2019/0308582 A1* | 10/2019 | Stegmeier | B60R 21/233 |
| 2019/0389420 A1 | 12/2019 | Dry et al. | |
| 2020/0062212 A1 | 2/2020 | Markusic | |
| 2020/0070767 A1 | 3/2020 | Kuepper et al. | |
| 2020/0086821 A1* | 3/2020 | Nakajima | B60R 21/2338 |
| 2020/0101923 A1 | 4/2020 | Kim et al. | |
| 2020/0164828 A1 | 5/2020 | Park et al. | |
| 2020/0189514 A1 | 6/2020 | Yoo et al. | |

FOREIGN PATENT DOCUMENTS

| | | | | |
|---|---|---|---|---|
| JP | 2015157602 | | 9/2015 | |
| JP | 2020152266 A | * | 9/2020 | |
| WO | WO-2017090772 A1 | * | 6/2017 | ......... B60R 21/2338 |
| WO | 2019107053 | | 6/2019 | |

OTHER PUBLICATIONS

Herzenstiel, et al., Office Action dated Apr. 8, 2020 for U.S. Appl. No. 15/894,711.
Herzenstiel, et al., Office Action dated Feb. 18, 2020 for U.S. Appl. No. 15/894,711.
Herzenstiel, et al., Office Action dated Jul. 29, 2020 for U.S. Appl. No. 15/894,711.
Herzenstiel, et al., Office Action dated Nov. 8, 2019 for U.S. Appl. No. 15/894,711.

* cited by examiner

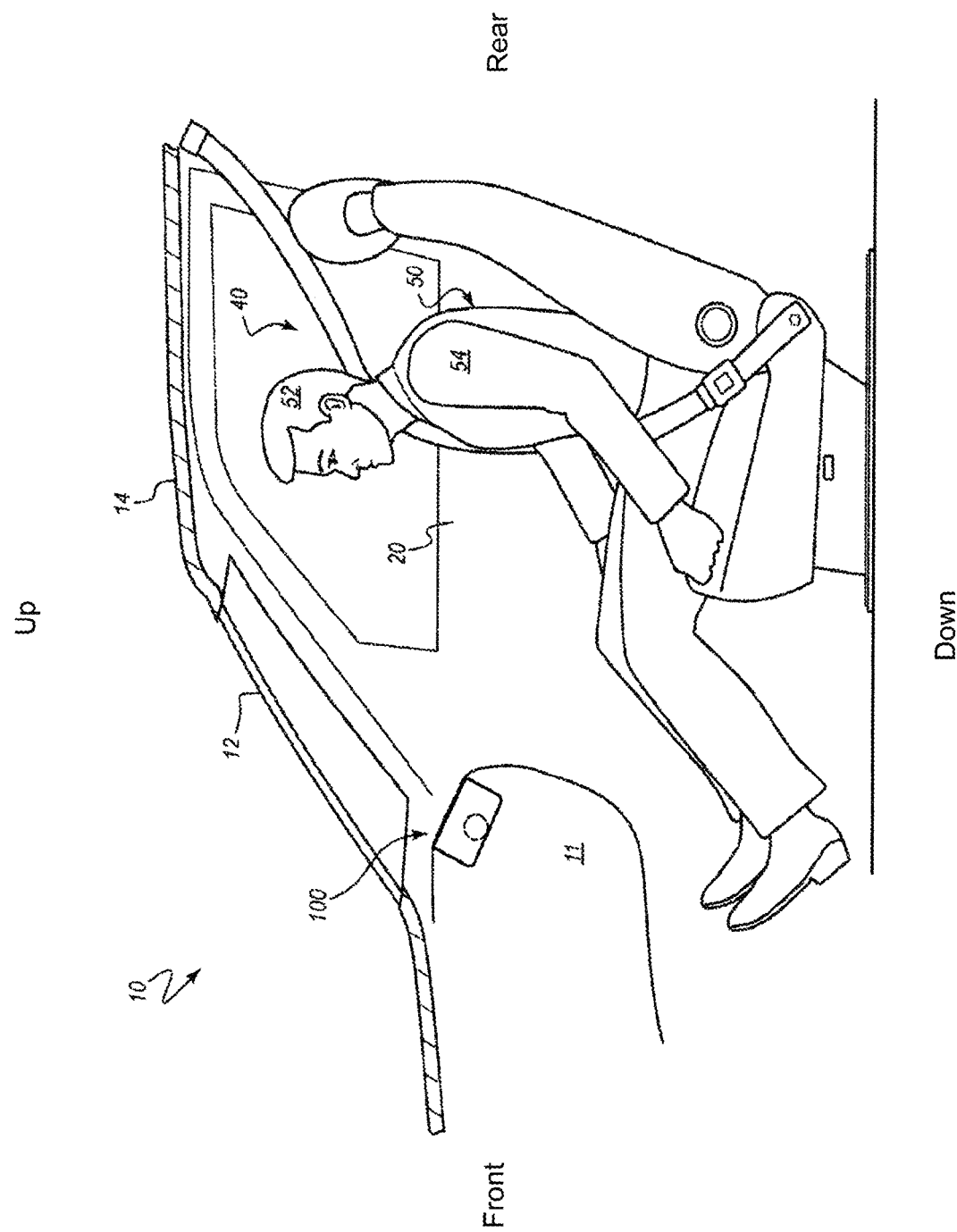
[FIG. 1]

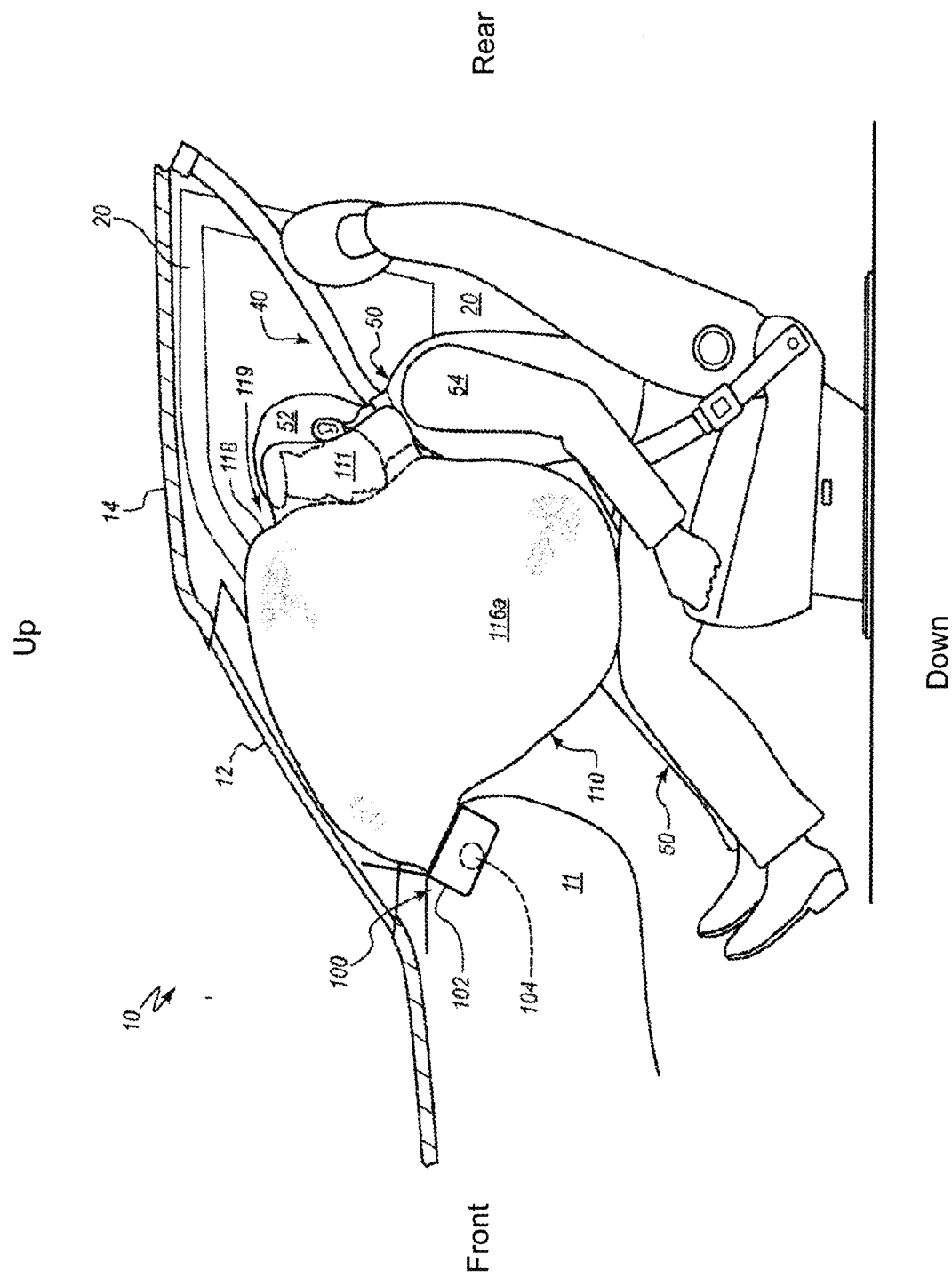
[FIG. 2]

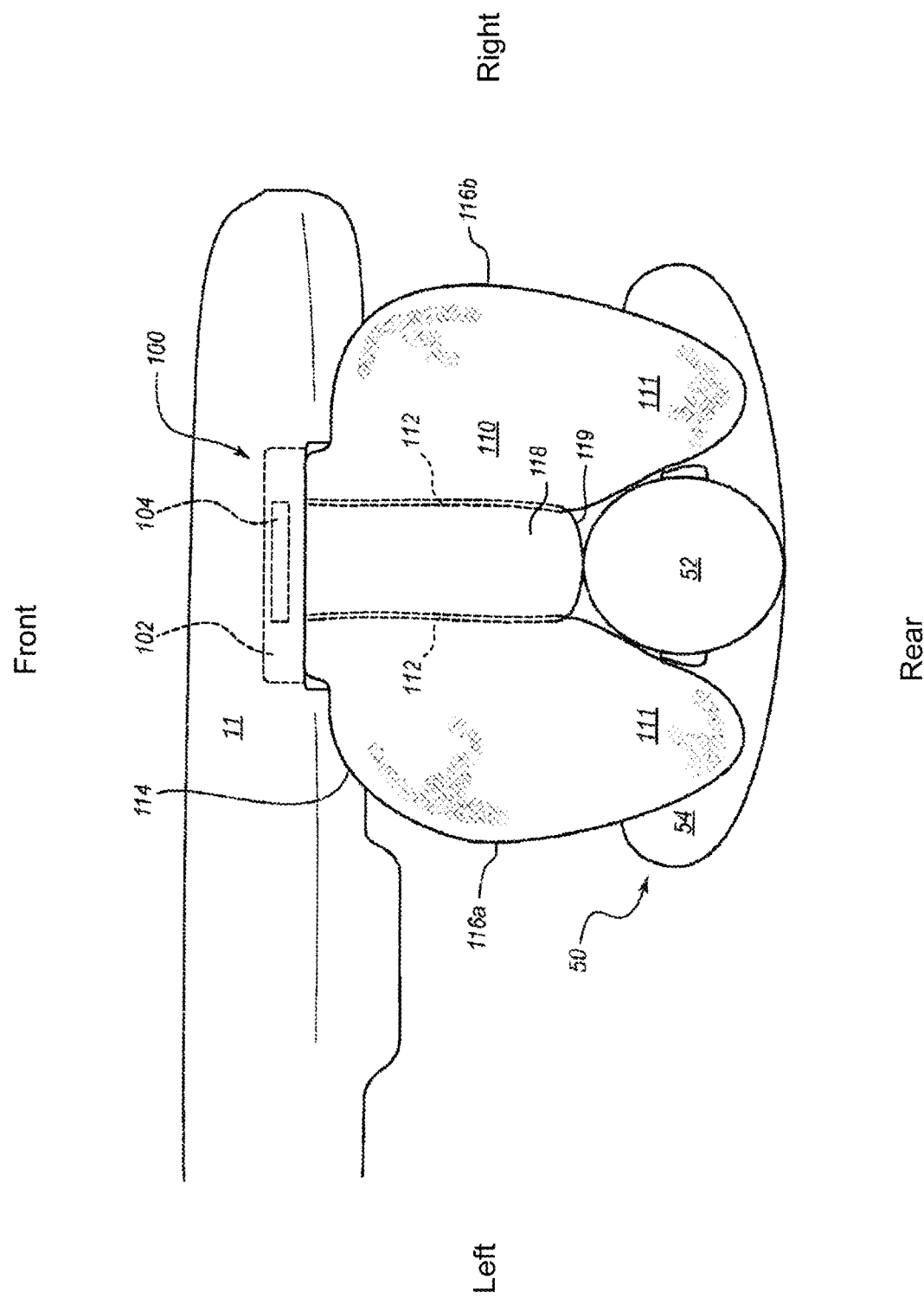
[FIG. 3]

[FIG. 4]
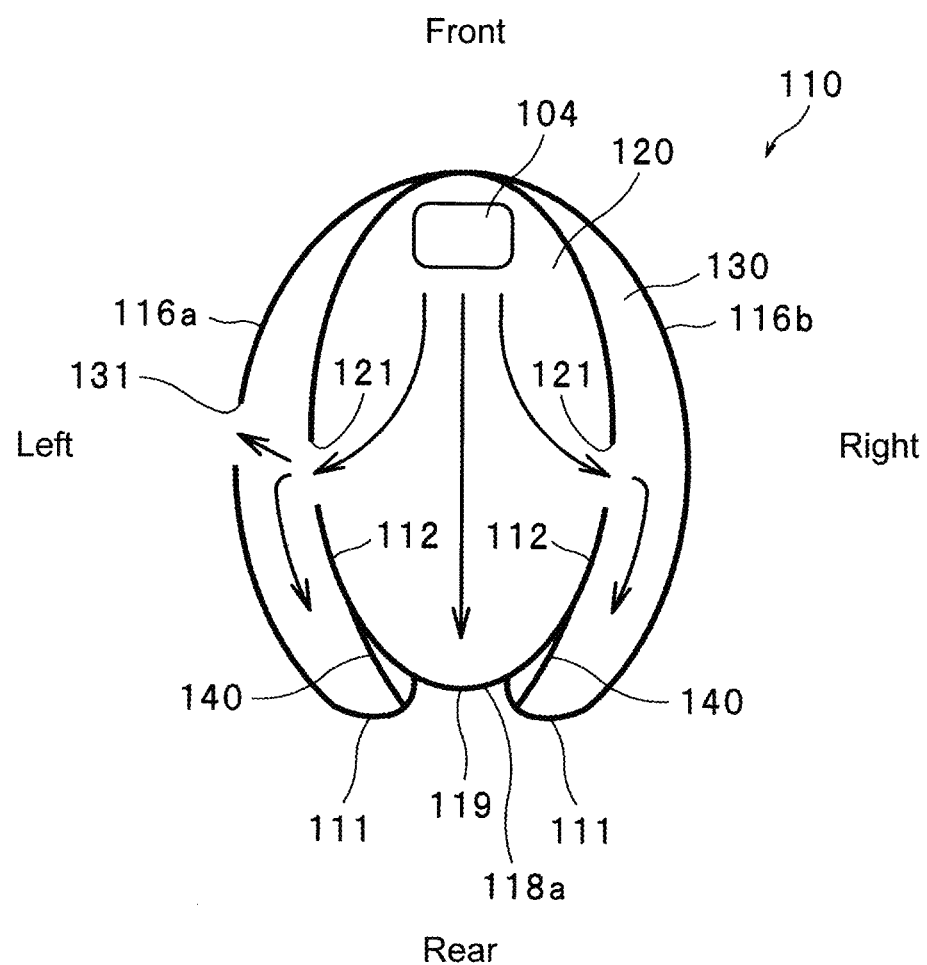

[FIG. 5]
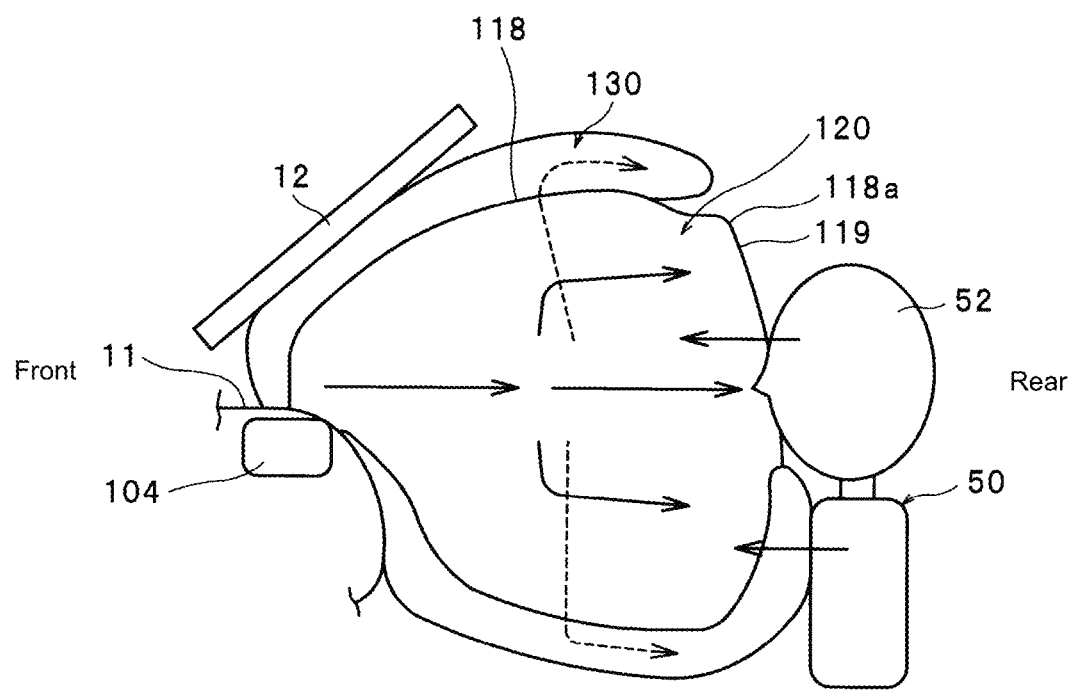

[FIG. 6]
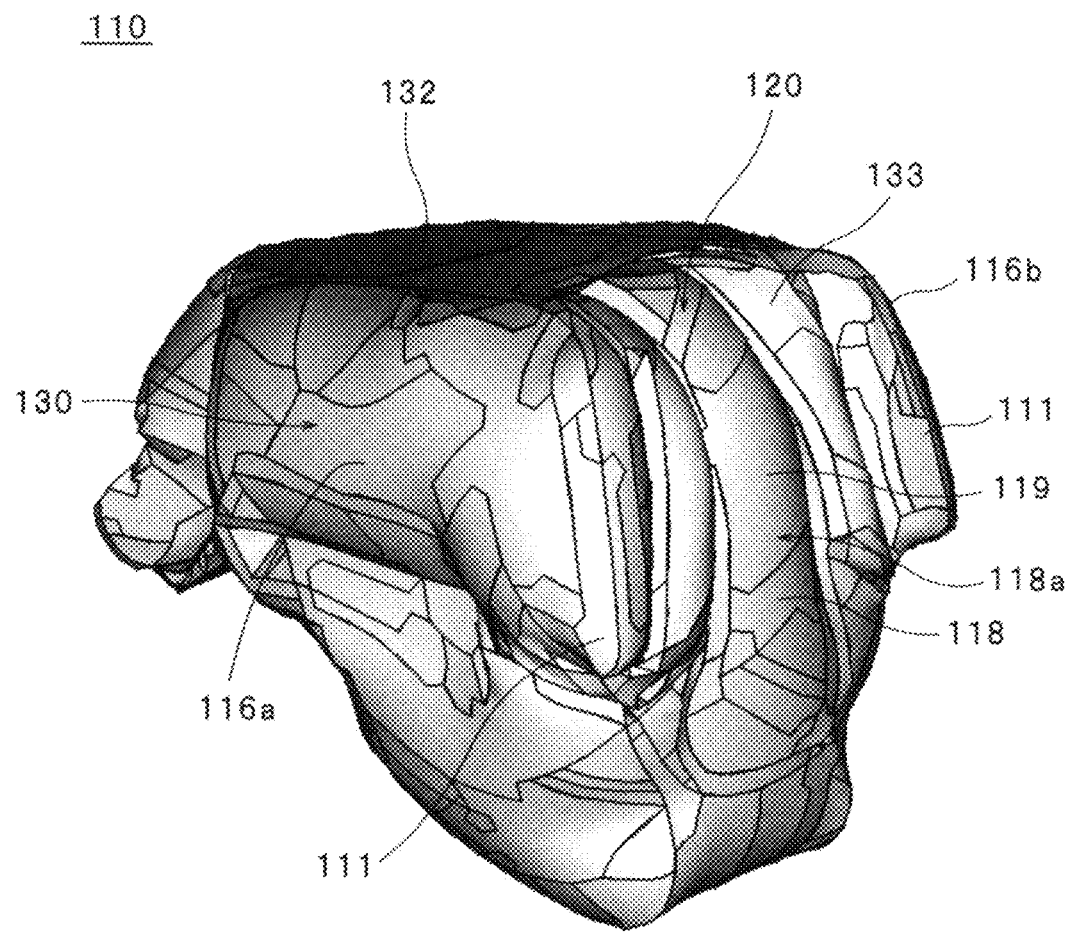
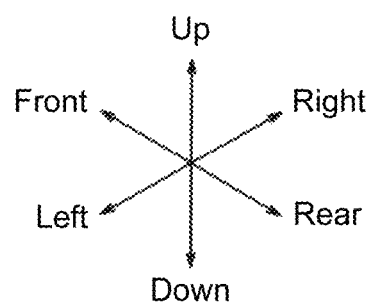

[FIG. 7]
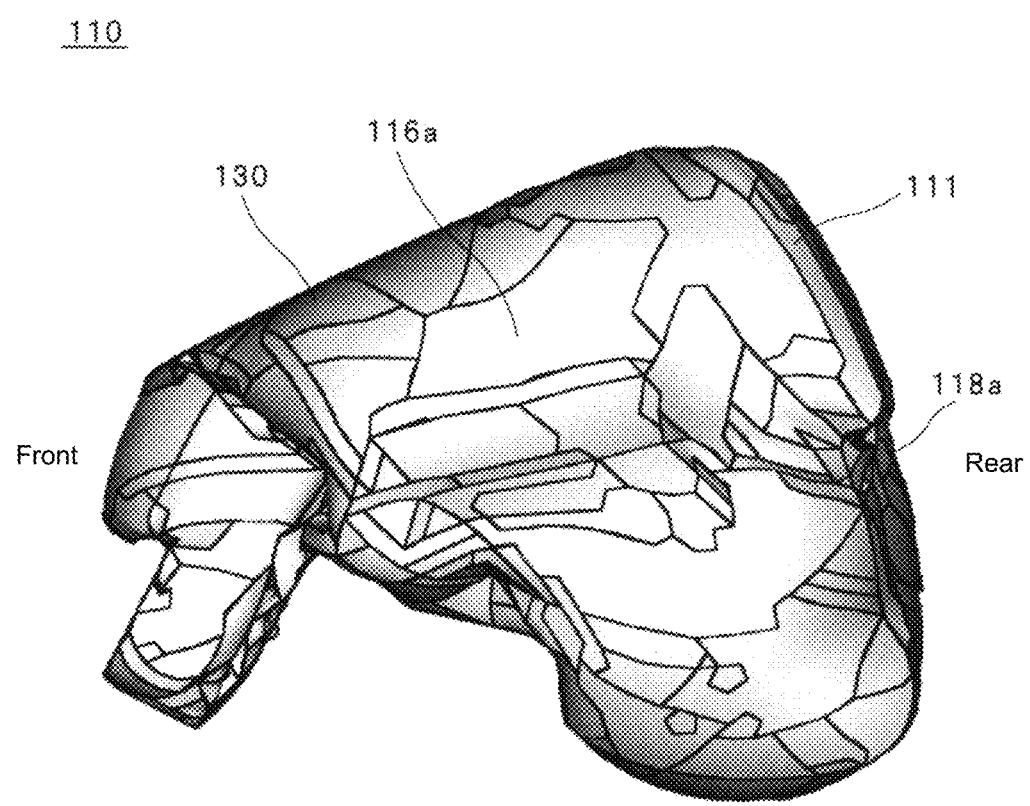

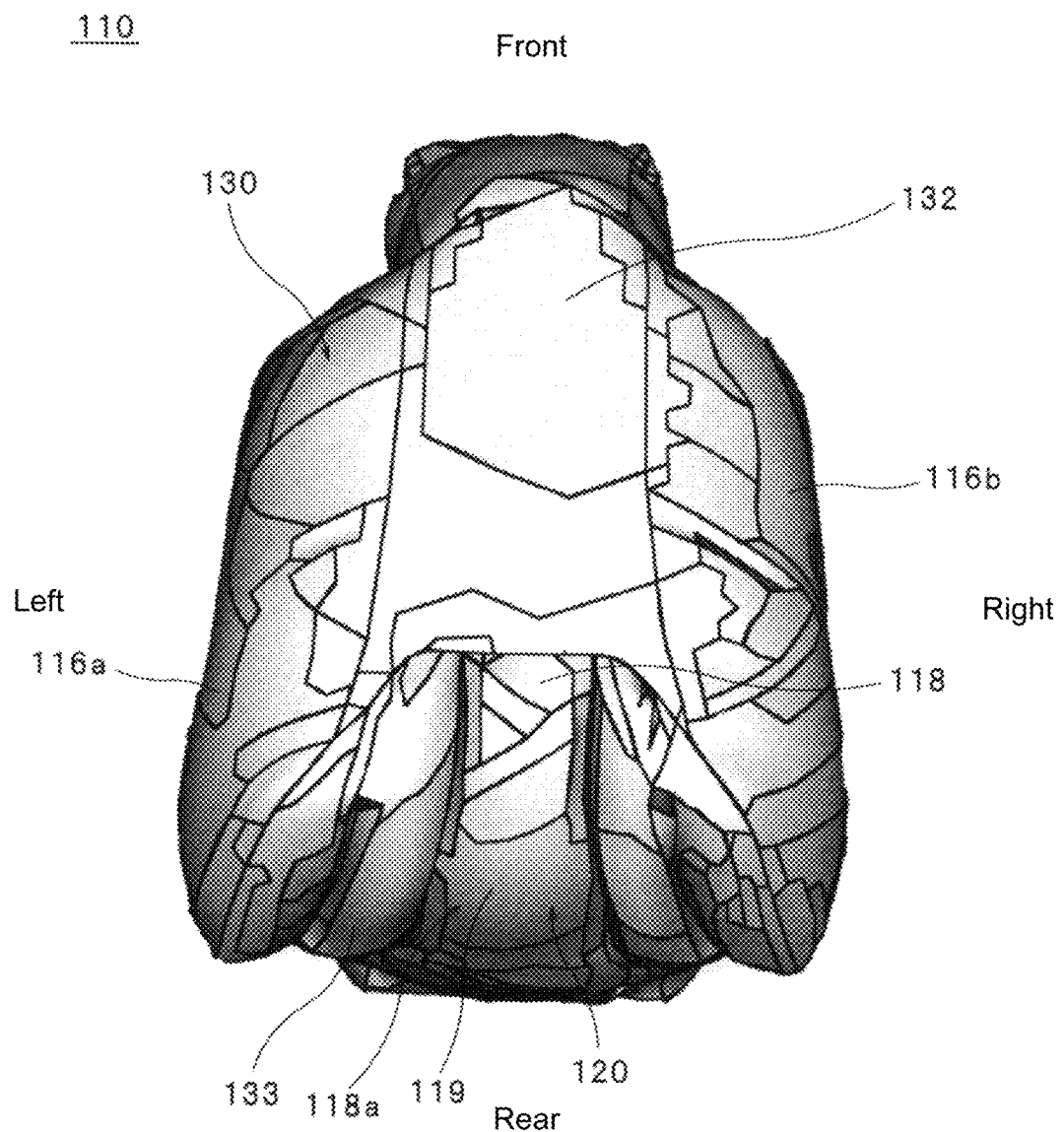

[FIG. 9]
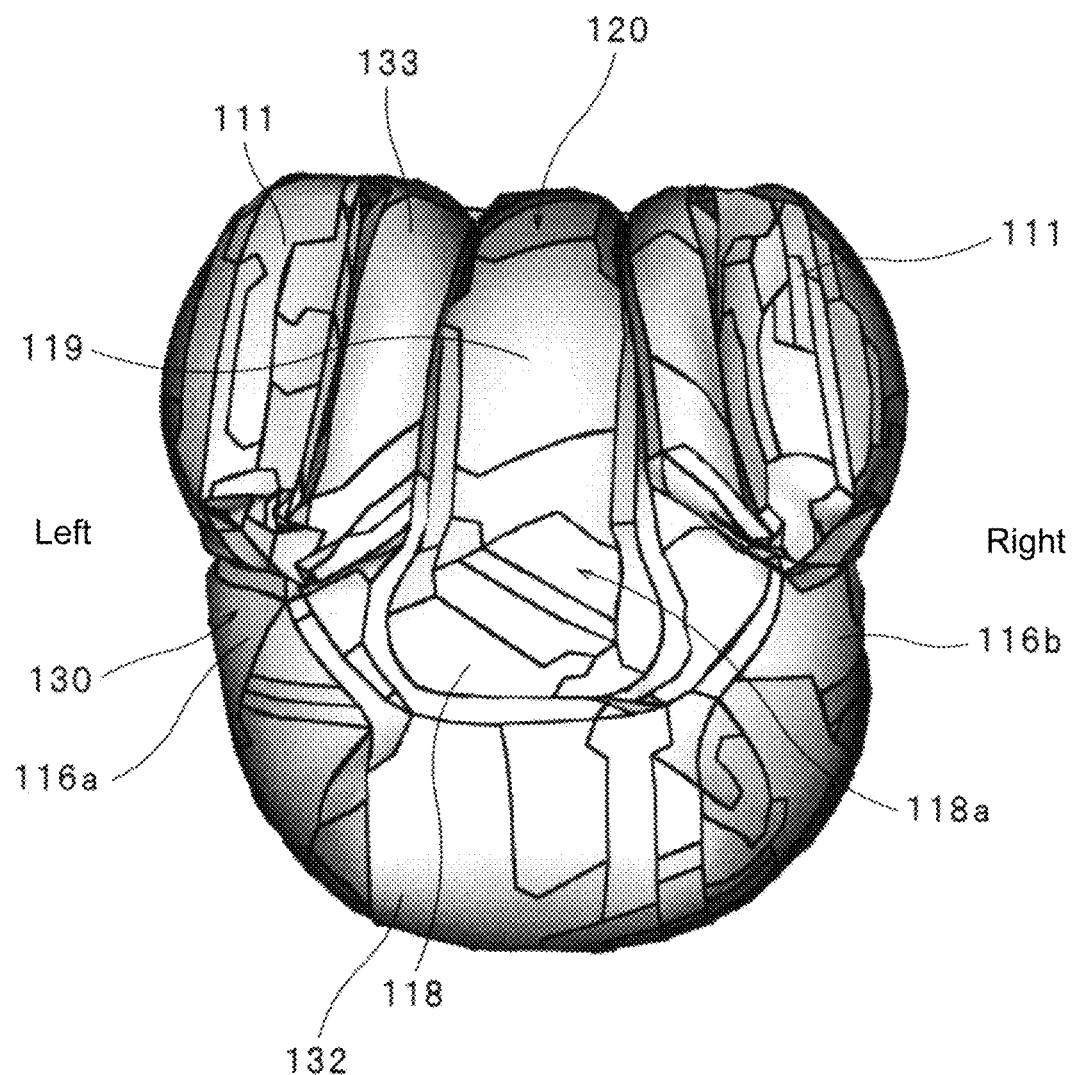

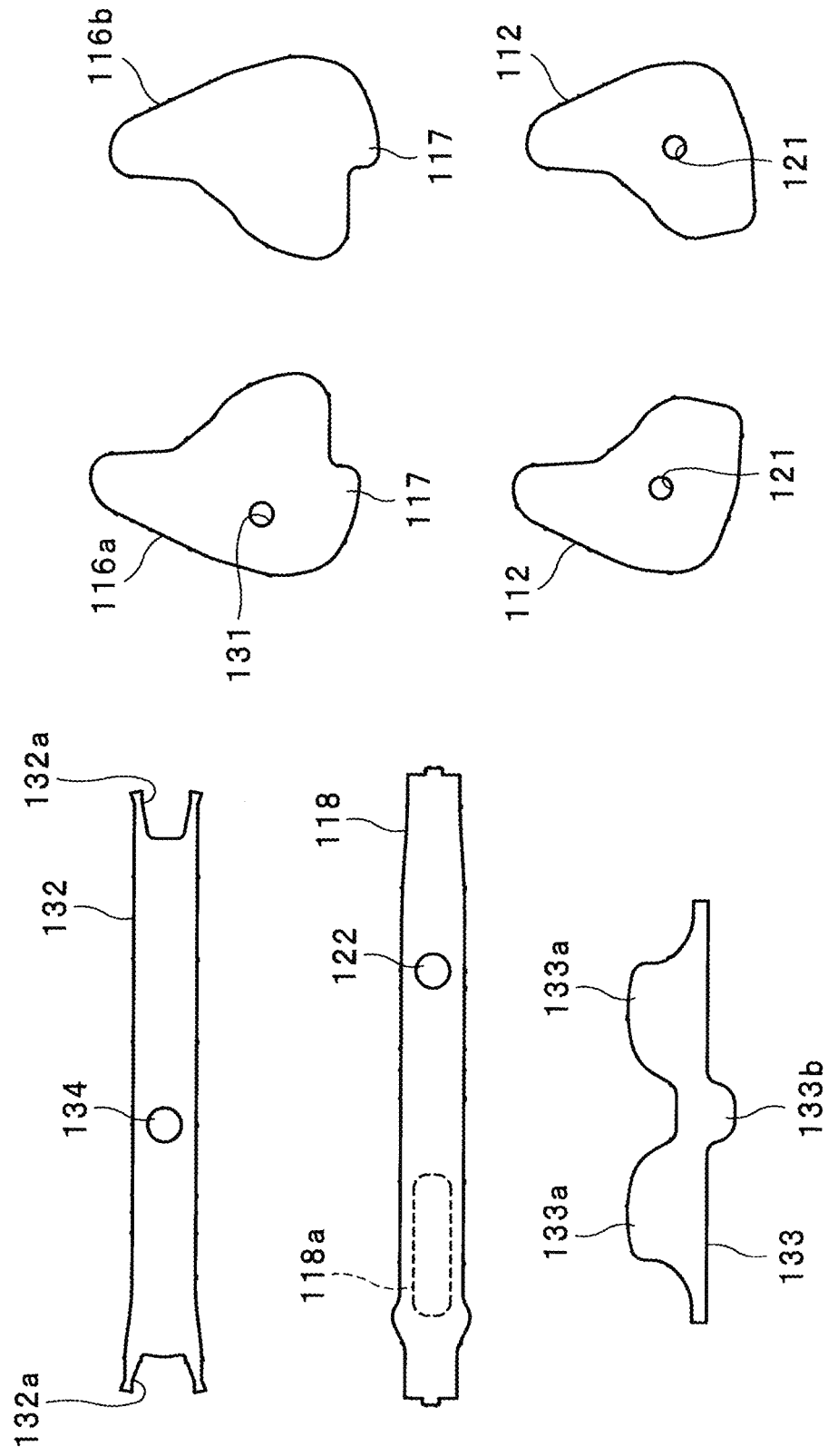
[FIG. 10]

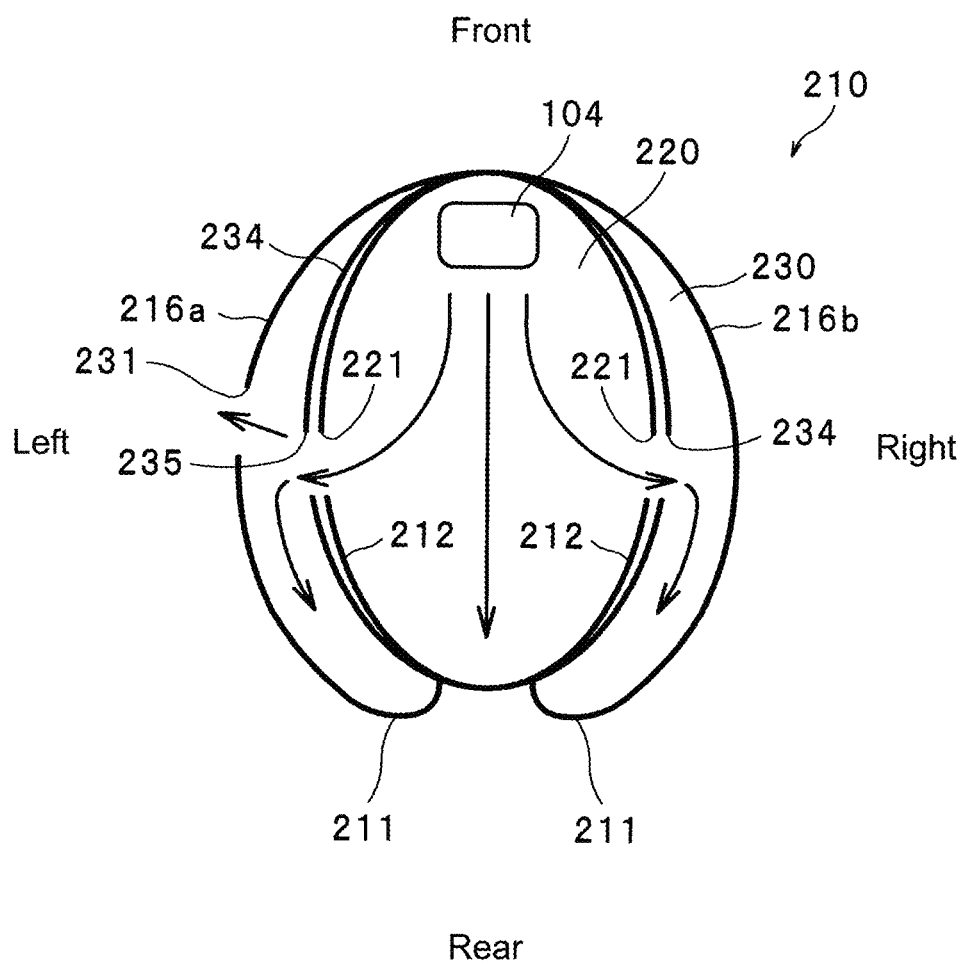

[FIG. 12]
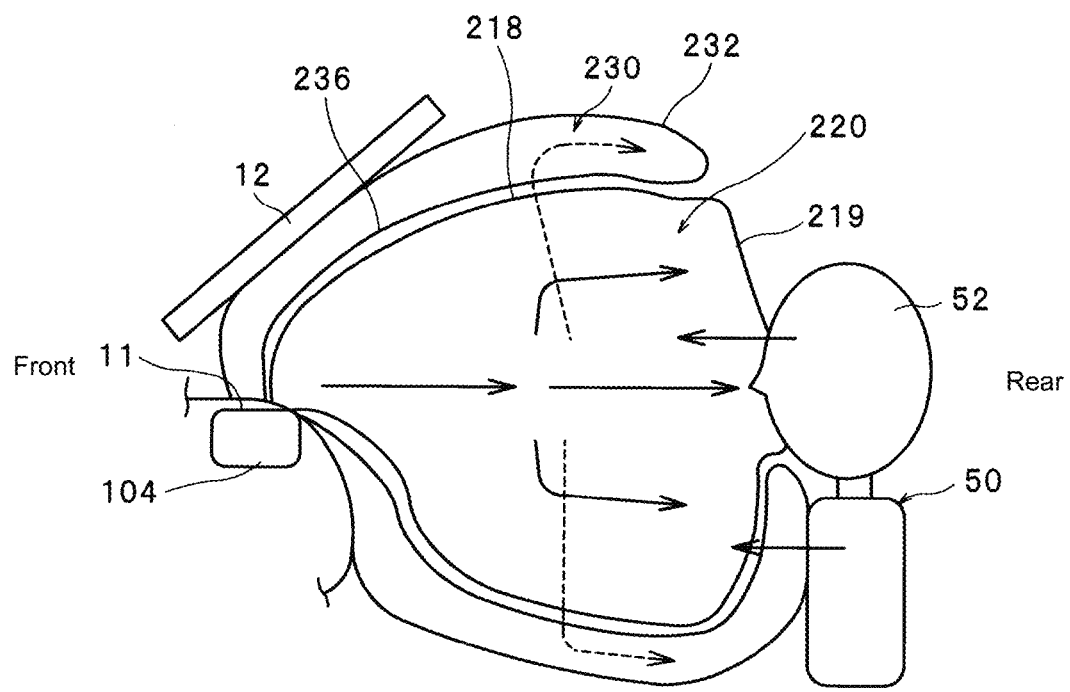

[FIG. 13]
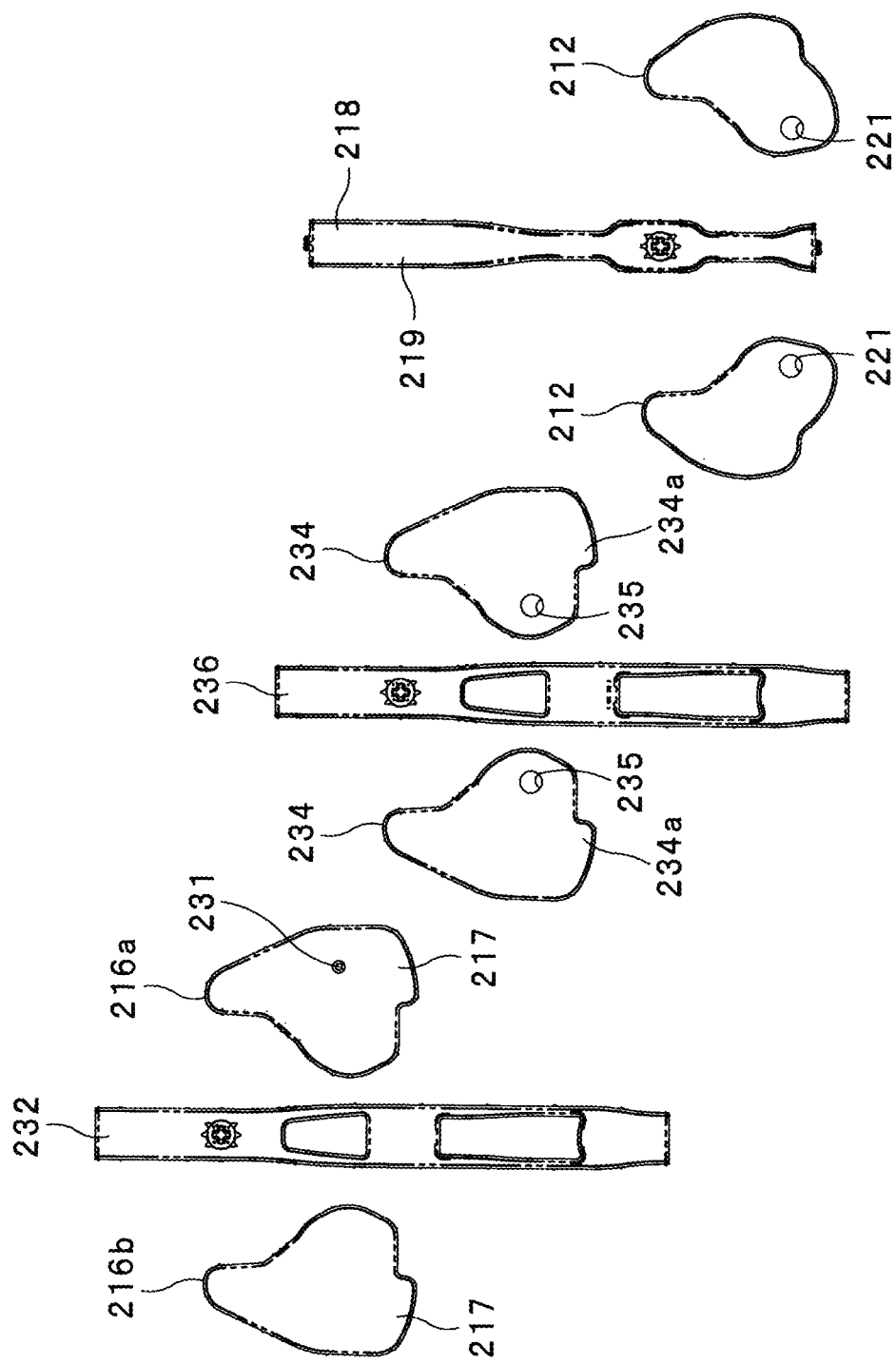

[FIG. 14]
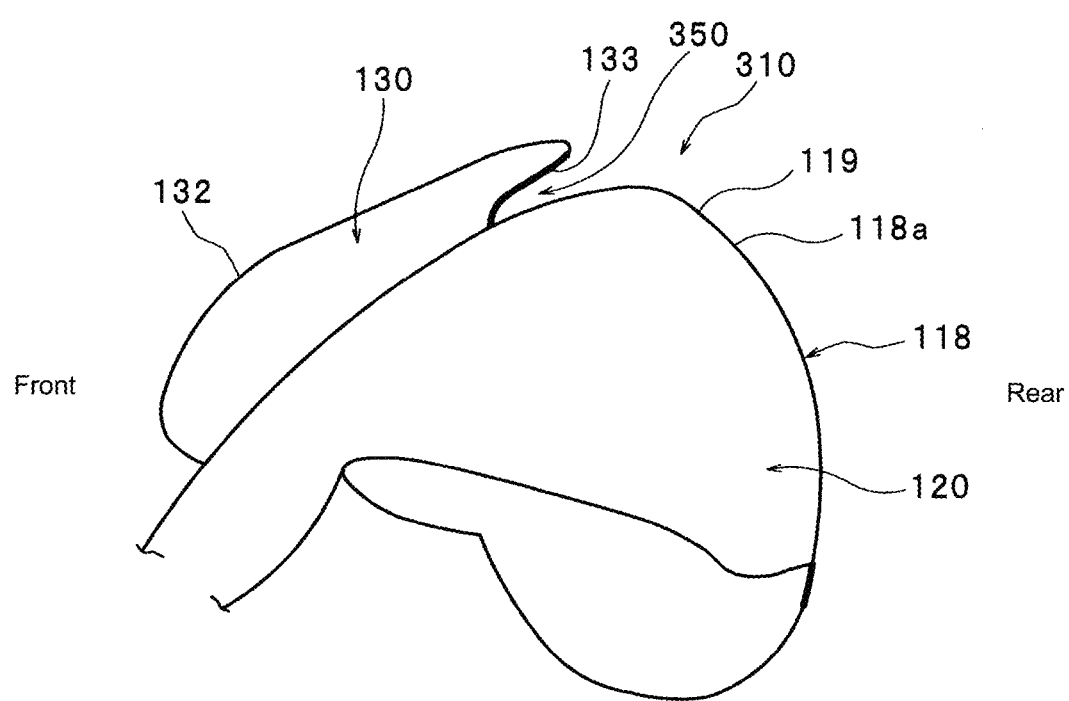

[FIG. 15]
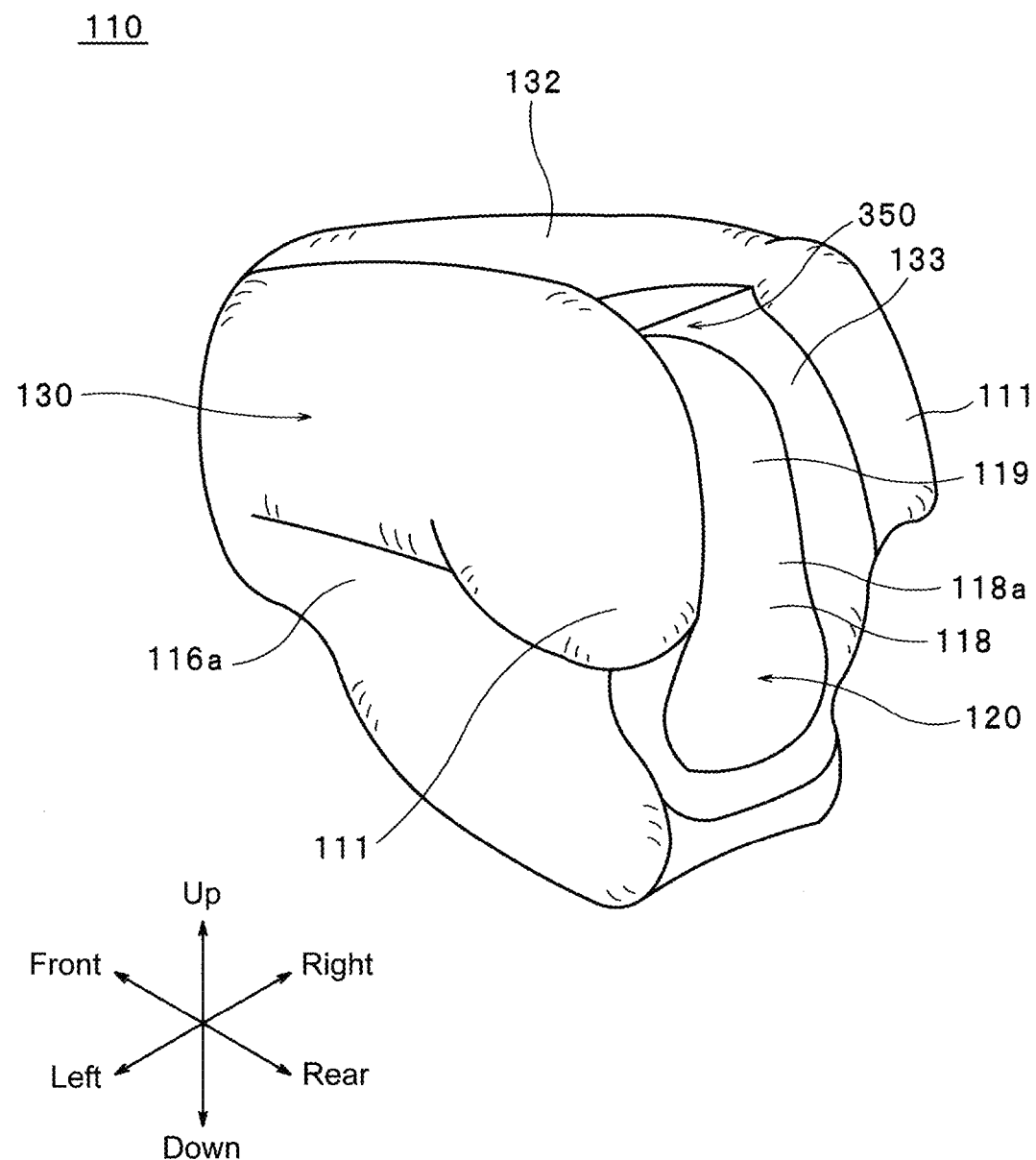

[FIG. 16]
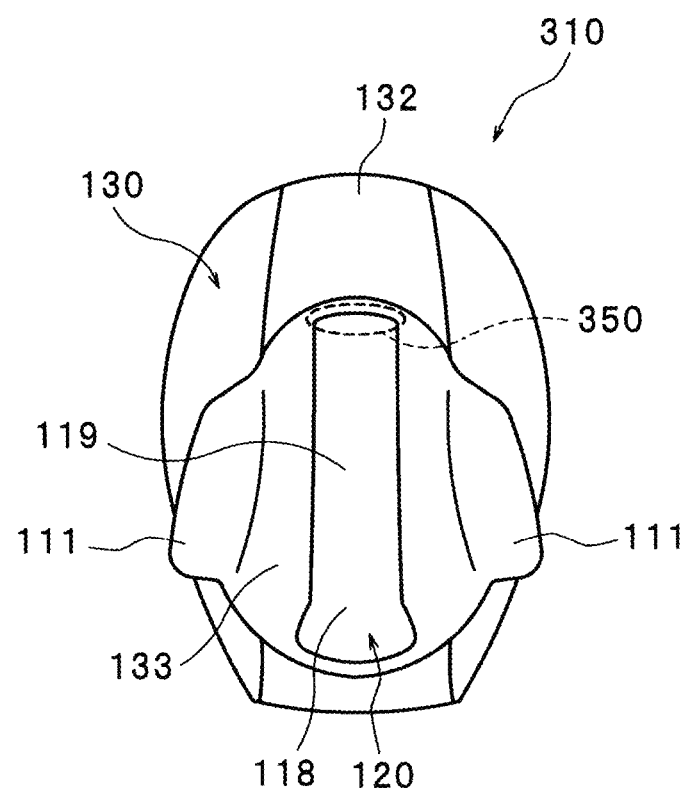

AIRBAG

CROSS-REFERENCE TO RELATED APPLICATIONS

This application claims the benefit of Japanese Patent Application No. 2018-142498 filed Jul. 30, 2018 and Japanese Patent Application No. 2019-115776 filed Jun. 21, 2019, the disclosure of which are herein incorporated by reference in their entirety.

TECHNICAL FIELD

The present invention relates to an airbag mounted in a vehicle to protect a passenger.

BACKGROUND

Airbag systems for detecting impact upon the collision of a vehicle, generating gas from an inflator, injecting the gas into an airbag, and inflating and deploying the airbag have gained popularity. An inflated and deployed airbag can prevent a passenger from colliding with structures in a vehicle.

Patent Document 1 describes an airbag for protecting a passenger having a left half airbag and a right half airbag. In this airbag, the seam allowance for stitching each inner panel of the left and right half airbags is provided in at least one of the left and right inner panels, with this seam allowance suppressing inflation of the airbag in the perpendicular direction.

Patent Document 2 describes a passenger protection apparatus including: an airbag for a driver seat to be inflated in front of the driver seat; an airbag for a passenger seat to be inflated in front of the passenger seat; and a central airbag to be inflated between the airbag for the driver seat and the airbag for the passenger seat.

RELATED ART DOCUMENTS

Patent Documents

[Patent Document 1] JP 2008-018936 A
[Patent Document 2] JP 2015-157602 A

SUMMARY OF THE INVENTION

Problem to be Solved by the Invention

Upon the collision of a vehicle, while an airbag can protect a passenger from colliding with other structures in the vehicle, the impact on the passenger from the airbag must be mitigated.

The present invention has been created in view of the abovementioned problem, with the object of providing an airbag anticipated to suitably protect a passenger of a vehicle.

Means for Solving the Problem

The airbag according to the present invention includes: an inner bag having a facing surface facing a passenger of a vehicle in the deployed state; an outer bag which is provided so as to surround the outer periphery of the inner bag with the facing surface exposed; and two protrusion parts which are provided in the outer bag and respectively disposed on the left and right sides in the width direction of the vehicle with respect to the facing surface so as to protrude rearward.

Moreover, in the airbag according to the present invention, the inner bag and the outer bag are partitioned by a common partition wall, with a ventilation port formed in the partition wall.

Moreover, in the airbag according to the present invention, the outer bag includes: left and right outer panels configuring left and right outer surfaces along with a portion of the protrusion parts; and an intermediate panel which is provided between the partition wall and the outer panel so as to configure a part different from the portion of the protrusion parts.

Moreover, in the airbag according to the present invention, the outer bag includes: left and right outer panels configuring left and right outer surfaces along with a portion of the protrusion parts; and an intermediate panel which is provided between the inner bag and the outer panel so as to configure a part different from the portion of the protrusion parts.

Moreover, in the airbag according to the present invention, the intermediate panel is provided so as to surround an exposed part which exposes at least a portion of the facing surface of the inner bag.

Moreover, in the airbag according to the present invention, a pocket part is provided such that an upper part of the exposed part of the inner bag along with a peripheral part of the upper part thereof is recessed.

Moreover, the airbag according to the present invention includes: an internal tether which is connected to the partition wall and the inner surface of the outer panel and bridged in the lateral direction inside the outer bag.

Moreover, in the airbag according to the present invention, the inner bag and the outer bag are each independent bag bodies, a ventilation port is formed in both the inner bag and the outer bag, and the inner bag and the outer bag are coupled around the ventilation port.

Moreover, in the airbag according to the present invention, the ventilation port is formed in left and right side faces of the inner bag.

Moreover, in the airbag according to the present invention, when the airbag is inflated, gas is fed from an inflator to the inner bag and from the inner bag to the outer bag through the ventilation port.

Moreover, in the airbag according to the present invention, a second ventilation port communicating with the inside and outside of the outer bag is formed in at least either one of the left and right outer surfaces of the outer bag.

In the present invention, a structure is employed in which the airbag has two bags consisting of the inner bag along with the outer bag surrounding the outer periphery thereof. The facing surface facing a passenger in the vehicle is provided in the inner bag. Two protrusion parts which are respectively disposed on the left and right sides of the facing surface of the inner bag so as to protrude rearward are provided in the outer bag. This structure enables a reduction in the impact due to contact with the passenger via the inner bag, along with the prevention of rotation of the passenger in the lateral direction, etc. via two protrusion parts of the outer bag. Moreover, if the inner bag and the outer bag have a two layered structure, the airbag can be more suitably inflated and deployed, while the facing surface and protrusion parts, etc. can be inflated and deployed into a suitable shape.

Moreover, in the present invention, the airbag has an integral configuration in which the inner bag and the outer bag are partitioned by a common partition wall. As a result, the amount of cloth making up an airbag having a two layered structure can be reduced, while weight reduction in the airbag can be anticipated. Moreover, a ventilation port is formed in a partition wall partitioning the inner bag and the outer bag. As a result, gas filled into the inner bag can be flowed out to the outer bag.

Moreover, in the present invention, the outer bag includes: left and right outer panels configuring left and right outer surfaces along with a portion of the protrusion parts; and an intermediate panel which is provided between the partition wall and the outer panel, with the intermediate panel configuring another portion of the protrusion parts. As a result, when the airbag is inflated and deployed, the protrusion parts can be formed into the desired shape.

Moreover, in the present invention, the outer bag includes: left and right outer panels configuring left and right outer surfaces along with a portion of the protrusion parts; and an intermediate panel which is provided between the inner bag and the outer panel, with the intermediate panel configuring another portion of the protrusion parts. As a result, when the airbag is inflated and deployed, the protrusion parts can be formed into the desired shape.

Moreover, in the present invention, the intermediate panel is provided so as to surround an exposed part which exposes at least a portion of the facing surface of the inner bag. As a result, when the airbag is inflated and deployed, the exposed part can be formed into the desired shape.

Moreover, in the present invention, a pocket part is provided such that an upper part of the exposed part of the inner bag along with a peripheral part thereof is recessed. As a result, when the passenger is constrained via the inflation and deployment of the airbag, the rotational force applied to the head of the passenger can be decreased, enabling a reduction in damage to the head.

Moreover, in the present invention, an internal tether which is connected to the partition wall and the inner surface of the outer panel and bridged in the lateral direction is provided inside the outer bag. The inclusion of this internal tether enables the outer bag of the airbag, specifically the protrusion parts, to be suitably inflated and deployed.

Moreover, in the present invention, the inner bag and the outer bag of the airbag are each provided as independent bag bodies. A ventilation port is formed in both the inner bag and the outer bag, while the inner bag and the outer bag are coupled around the ventilation port. As a result, gas filled into the inner bag can be flowed out to the outer bag. Moreover, the ventilation port may be formed in both the left and right side faces of the inner bag, such that the gas filled into the inner bag can be efficiently flowed out from the left and right ventilation ports to the outer bag.

Effects of the Invention

According to the present invention, suitable protection of a passenger of a vehicle is anticipated.

BRIEF DESCRIPTION OF THE DRAWINGS

FIG. 1 is a schematic view illustrating the state prior to the deployment of an airbag in a vehicle in which the airbag according to the present embodiment is mounted.

FIG. 2 is a schematic side view illustrating the state after the deployment of the airbag in the vehicle in which the airbag according to the present embodiment is mounted.

FIG. 3 is a schematic plan view illustrating the deployed state of the airbag according to the present embodiment.

FIG. 4 is a schematic cross sectional view illustrating the internal structure of an airbag according to Embodiment 1.

FIG. 5 is a schematic cross sectional view describing the internal structure of the airbag according to Embodiment 1.

FIG. 6 is an external view of the airbag according to the present embodiment.

FIG. 7 is an external view of the airbag according to the present embodiment.

FIG. 8 is an external view of the airbag according to the present embodiment.

FIG. 9 is an external view of the airbag according to the present embodiment.

FIG. 10 is an exploded view of the airbag according to the present embodiment.

FIG. 11 is a schematic cross sectional view describing the internal configuration of an airbag according to Embodiment 2.

FIG. 12 is a schematic cross sectional view describing the internal configuration of the airbag according to Embodiment 2.

FIG. 13 is an exploded view of the airbag according to Embodiment 2.

FIG. 14 is a schematic cross sectional view describing the internal configuration of an airbag according to Embodiment 3.

FIG. 15 is a schematic perspective view illustrating the appearance of the airbag according to Embodiment 3.

FIG. 16 is a schematic front view illustrating the appearance of the airbag according to Embodiment 3.

DESCRIPTION OF THE PREFERRED EMBODIMENT

Embodiment 1

FIG. 1 is a schematic view illustrating the state prior to the deployment of an airbag in a vehicle in which the airbag according to the present embodiment is mounted. The airbag including an airbag assembly 100 according to the present embodiment is installed in a vehicle 10. The vehicle 10 includes a dashboard 11, a front glass 12, a roof 14, a side door 20, etc. Moreover, in a vehicle cabin of the vehicle 10, for example, a seat 40 in which a passenger 50 sits is provided behind the dashboard 11. The seat 40 may include a seat, cushion, pad, headrest, etc. FIG. 1 illustrates one example of the state in which the passenger 50 suitably sits on the seat 40. In this state, a head 52, along with a body part and shoulder part (hereinafter, referred to as a body shoulder) 54 of the passenger 50 have an upright positional relationship. The airbag assembly 100 is mounted on the dashboard 11 in front of the seat 40.

Note that terms regarding directions such as the front, rear, left, right, up, and down used in the descriptions of the present embodiment are based on the front, rear, left, right, up, and down directions of the vehicle 10. Moreover, terms such as horizontal, parallel, vertical, and perpendicular are used based on the vehicle 10, such that it does not matter whether or not the vehicle 10, for example, is horizontal to the ground. Moreover, the airbag assembly 100 according to the present embodiment is installed on the dashboard 11 of the vehicle 10, with the installation position not limited to the dashboard 11. For example, the airbag assembly 100 may be installed in the vicinity of a steering wheel, side door, and roof rail of the vehicle 10 or at various locations other than these. Moreover, the dashboard 11 may also be referred to as an instrument panel, etc.

FIG. 2 is a schematic side view illustrating the state after the deployment of the airbag in the vehicle in which the airbag according to the present embodiment is mounted. FIG. 3 is a schematic plan view illustrating the deployed state of an airbag 110 according to the present embodiment. The airbag assembly 100 includes a housing 102, an inflator 104, and an airbag 110. The airbag assembly 100 inflates and deploys the airbag 110 upon a collision of the vehicle 10, providing buffering and protection to the passenger 50 sitting on the seat 40. A collision sensor causing the deployment operation of the airbag assembly 100, etc. is mounted on the vehicle 10.

The housing 102 of the airbag assembly 100 has any suitable kind of box body shape in which the airbag 110 may be stored in a non-deployed state. The housing 102 may include a cover, etc. The cover is of any suitable kind, with examples thereof capable of including a tear seam or burst seam, etc. with which the airbag 110 can be deployed. The housing 102 is installed and fixed to the dashboard 11 of the vehicle 10 via any suitable method.

The inflator 104 is an apparatus for releasing gas for inflation to inflate the airbag 110 and may include a pipe, wiring, etc. For example, the inflator 104 can be configured to feed the gas through a pipe communicating with the inside of the airbag 110. The inflator 104 is configured to start inflation of the airbag 110 when any suitably predetermined event such as a collision of the vehicle 10 occurs.

The airbag 110 may be manufactured by coupling multiple parts via one piece weaving, a cut and sewn technique, or any suitable method other than these, or combinations of these methods. The airbag 110 according to the present embodiment has multiple panels coupled via seams for forming an inflatable chamber or another method and may be configured by coupling these multiple panels. The seams can be formed by, for example, stitching, adhesion, taping, high frequency welding, ultrasonic welding, thermal adhesion, or any other suitable technique, or combination thereof.

The airbag 110 illustrated in FIG. 2 is configured to include a central panel 118, along with multiple panels which are coupled to the central panel 118 to form an inflatable chamber. Among these multiple panels, a left panel 116a forming the left side face of the airbag 110 is illustrated in FIG. 2, with the airbag 110 having a right panel 116b forming a pair with this left panel 116a (see FIG. 3). The left panel 116a faces the central side of the vehicle 10, while the right panel 116b faces the side door 20 of the vehicle 10. The central panel 118 includes an occupant facing surface 119 which faces the head 52 of the passenger 50 sitting on the seat 40 in the inflated and deployed state of the airbag 110. The occupant facing surface 119 is disposed in front of the seat 40 so as to receive the head 52 of the passenger 50 which moves substantially forward with respect to the vehicle 10. One or more additional surfaces may be provided in the airbag 110 so as to be adjacent to the occupant facing surface 119. The occupant facing surface 119 of the central panel 118 may be provided as a substantially flat surface to receive the head of the passenger 50.

The airbag 110 may be configured to receive the front surface of the head 52 of the passenger 50 when a collision of the vehicle 10 occurs. For example, the airbag 110 may be disposed immediately in front of the seat 40 of the vehicle 10 when inflated and deployed. As illustrated in FIGS. 1 and 2, the passenger 50 of the vehicle 10 is disposed at a typical or anticipated location which may impact the disposed airbag 110. The airbag 110 is deployed from the housing 102 of the airbag assembly 100 via the operation of the inflator 104. As illustrated in FIG. 3, the deployed airbag 110 includes two lobes 111 which are disposed on both the left and right sides of the head 52 of the passenger 50 so as to protrude towards the rear of the vehicle 10. Both the left and right lobes 111 are at least partially formed of a portion of the left panel 116a or the right panel 116b. The lobes 111 are respectively adjacent to the left panel 116a or the right panel 116b and can obtain the same or nearly the same inner pressure and cloth tension as the left panel 116a or the right panel 116b when the airbag 110 is inflated and deployed. The two lobes 111 of the airbag 110 protrude towards the rear of the vehicle 10 on the body shoulder 54 on both the left and right sides of the head 52 of the passenger 50.

FIGS. 4 and 5 are each a schematic cross sectional view describing the internal structure of the airbag 110 according to Embodiment 1. FIG. 4 illustrates a cross section in the horizontal direction, while FIG. 5 illustrates a cross section in the perpendicular direction. Moreover, FIGS. 4 and 5 illustrate the flow of gas fed from the inflator 104 using arrows. The airbag 110 according to the present embodiment is configured by combining two bags consisting of an inner bag 120 and an outer bag 130. The inner bag 120 includes the abovementioned central panel 118 and occupant facing surface 119, etc. In order to expose an exposed part 118a including the occupant facing surface 119, the outer bag 130 is provided so as to surround the up, down, left, and right of the inner bag 120, in addition to including the abovementioned left panel 116a, right panel 116b, two lobes 111, etc. The inner bag 120 and the outer bag 130 are separated by panels 112 in the lateral direction partition, while separated by a portion of the central panel 118 in the vertical direction. The inner bag 120 and the outer bag 130 are bonded in an aspect of sharing a portion of the partition panels 112 and the central panel 118.

A ventilation port connected to the inflator 104 is provided in the inner bag 120. A ventilation port 121 is formed in each of the left and right partition panels 112 separating the inner bag 120 and the outer bag 130. Moreover, an external ventilation port 131 is formed in the left panel 116a of the outer bag 130. The inflator 104 feeds gas to the inner bag 120 of the airbag 110, but does not directly feed gas to the outer bag 130. The gas from the inflator 104 quickly flows in the outer bag 130 from the inner bag 120 through the ventilation port 121 and is discharged outside the airbag 110 from the external ventilation port 131 of the outer bag 130. Note that while not limited thereto, in the present embodiment, the external ventilation port 131 is configured so as to only be formed in the left panel 116a, so as to only be formed in the right panel 116b, or so as to be formed in both the left panel 116a and the right panel 116b.

Moreover, the two lobes 111 assisting in deploying and forming two tethers 140 are provided inside the outer bag 130.

The front end of each tether 140 is fixed to the outer surface of the partition panels 112 (the surface on the outer bag 130 side), while the rear end thereof is fixed to the inner surface of the lobes 111. In the deployed state of the airbag 110, each tether 140 is provided such that the inside of the outer bag 130 is bridged between the outer surface of the partition panels 112 and the inner surface of the lobes 111, with each tether 140 stretching from the front end to the rear end. Moreover, each tether 140 stretches at a predetermined tilt in the lateral direction with respect to the anteroposterior direction of the vehicle 10. The tether 140 tenses and is pulled upon inflation of the airbag 110 so as to form the two lobes 111 at the left and right predetermined positions of the occupant facing surface 119.

FIGS. 6 to 9 are each external views of the airbag according to the present embodiment. FIG. 6 illustrates a perspective view seen from the upper left diagonal rear, FIG. 7 illustrates a left side face view, FIG. 8 illustrates a plan view seen from above, and FIG. 9 illustrates a view seen from behind. Moreover, FIG. 10 is an exploded view of the airbag 110 according to the present embodiment. However, the exploded view of FIG. 10 is illustrated by simplifying the components of the airbag 110 and may include various parts in addition to multiple panels, with the panels capable of being coupled via various parts (not illustrated).

The inner bag 120 of the airbag 110 is configured to include the central panel 118, along with the two partition panels 112. In the exploded state illustrated in FIG. 10, the central panel 118 has an elongated belt shape in which the width thereof appropriately changes. A wide part of the central panel 118 and the peripheral part thereof form the exposed part 118a (occupant facing surface 119) which is externally exposed without being covered by the outer bag 130. A ventilation port 122 with gas fed from the inflator 104 is formed at a location different from the occupant facing surface 119 in the central panel 118.

The partition panels 112 are members common to the inner bag 120 and the outer bag 130. The partition panels 112 are of a polygonal shape (with corner parts rounded) which is surrounded by appropriate curves and straight lines, with appropriate recesses and projections provided therein. The two partition panels 112 are symmetrically depicted in FIG. 10, but have the same shape when overlapped. The central panel 118 is circular with both ends thereof coupled in the longitudinal direction. Moreover, the left and right long side parts of the central panel 118 are each coupled around the entire periphery of the peripheral edge part of the partition panels 112. The bag shaped inner bag 120 is thus configured.

The outer bag 130 of the airbag 110 is configured to include an outer central panel 132, a coupling panel 133, and the left panel 116a as well as the right panel 116b. In the exploded state illustrated in FIG. 10, the outer central panel 132 has an elongated rectangular or belt shape, with a recess 132a provided on both ends in the longitudinal direction. A ventilation port 134 through which the gas fed from the inflator 104 passes is formed in the outer central panel 132. The outer central panel 132 is provided so as to cover the central panel 118 of the inner bag 120 other than the exposed part 118a including the occupant facing surface 119. Moreover, the outer central panel 132 of the outer bag 130 and the central panel 118 of the inner bag 120 are coupled around the ventilation ports 122 and 134.

The left panel 116a and the right panel 116b have similar shapes as those of the partition panels 112, in addition to including a tongue shaped part 117 for forming the lobes 111. This tongue shaped part 117 is folded and coupled to form the outer part of the lobes 111, along with a portion of the inner part. The left panel 116a and the right panel 116b have nearly the same shape when overlapped, but are different in that the external ventilation port 131 is formed in the left panel 116a while the external ventilation port is not formed in the right panel 116b.

In the exploded state illustrated in FIG. 10, the coupling panel 133 is configured such that two tongue shaped parts 133a are provided on one long side of an elongated rectangle, with the tongue shaped part 133b provided on the other long side.

The coupling panel 133 is interposed and provided between the inner bag 120 and the outer bag 130. A long side part on the side in which the tongue shaped part 133b of the coupling panel 133 is provided surrounds the periphery of the exposed part 118a (occupant facing surface 119) exposed outside the inner bag 120 so as to be coupled to the partition panels 112 of the inner bag 120. A long side part on the side in which the two tongue shaped parts 133a of the coupling panel 133 are provided is coupled to the outer bag 130. Moreover, the two tongue shaped parts 133a of the coupling panel 133 are respectively coupled to the left panel 116a of the outer bag 130 and the tongue shaped parts 117 of the right panel 116b so as to form a portion of the lobes 111.

One end of the outer central panel 132 of the outer bag 130 in the longitudinal direction is coupled to the coupling panel 133 by interposing the coupling panel 133 with respect to the end on the front upper side of the occupant facing surface 119 of the inner bag 120. The other end of the outer central panel 132 is coupled to the coupling panel 133 by interposing the coupling panel 133 with respect to the end on the rear lower side of the occupant facing surface 119 of the inner bag 120. The peripheral edge part of a portion of the left panel 116a and the right panel 116b (a part excluding the formation part of the lobes 111) is coupled to a long side part of the outer central panel 132. The remaining parts of the left panel 116a and the right panel 116b are coupled to the coupling panel 133 by interposing the coupling panel 133 with respect to the left and right ends of the occupant facing surface 119 of the inner bag 120.

Note that while the illustration thereof is omitted in FIG. 10, the airbag 110 includes parts configuring the two tethers 140. The tethers 140 are incorporated into the outer bag 130 prior to coupling the outer central panel 132 of the outer bag 130 to the left panel 116a and the right panel 116b. The tethers 140, for example, form a rectangular shape, with one side thereof coupled to a predetermined position of the partition panels 112 and one side on the opposite side coupled to each predetermined position of the left panel 116a or the right panel 116b.

The airbag 110 according to the present embodiment having the above configuration is configured to include two bags consisting of the inner bag 120 and the outer bag 130. The occupant facing surface 119 facing the head 52 of the passenger 50 of the vehicle 10 is provided in the inner bag 120. The two lobes 111 which are disposed on the left and right sides of the occupant facing surface 119 of the inner bag 120 so as to protrude rearward are provided in the outer bag 130. This structure enables the airbag 110 to reduce the impact due to contact with the passenger 50 via the inner bag 120 and prevent rotation of the passenger 50 in the lateral direction, etc. via the two lobes 111 of the outer bag 130. Moreover, if the airbag 110 has a two layered structure consisting of the inner bag 120 and the outer bag 130, the airbag 110 can be more suitably inflated and deployed, while the occupant facing surface 119, the lobes 111, etc. can be inflated and deployed into a suitable shape.

Moreover, the airbag 110 according to Embodiment 1 has an integral structure in which the inner bag 120 and the outer bag 130 are partitioned by the common partition panels 112. As a result, the amount of cloth making up the airbag 110, etc. can be reduced, while weight reduction in the airbag 110, etc. can be anticipated. Moreover, the ventilation port 121 is formed in the partition panels 112. As a result, gas fed to the inner bag 120 can be quickly flowed out from the outer bag 130.

Moreover, the outer bag 130 includes: the left panel 116a and the right panel 116b which configure left and right outer surfaces along with a portion of the lobes 111; and the coupling panel 133 provided between the left panel 116a or the right panel 116b and the common partition panels 112, with the coupling panel 133 configuring another portion of the lobes 111. As a result, when the airbag 110 is inflated and deployed, the lobes 111 can be formed into the desired shape.

Moreover, the airbag 110 includes the two tethers 140 inside the outer bag 130.

Each tether 140 is provided so as to be connected to the surface outside the partition panels 112 and the surface inside the left panel 116a or the right panel 116b and bridged in the lateral direction inside the outer bag 130. When the airbag 110 includes the tether 140, the outer bag 130, specifically the lobes 111, can be suitably inflated and deployed.

Note that while not limited thereto, the airbag 110 according to Embodiment 1 has a configuration in which the inner bag 120 and the outer bag 130 are separated by the common partition panels 112. As illustrated in the following Embodiment 2, the inner bag 120 and the outer bag 130 may be configured as independent bags. Moreover, the descriptions and drawings of the present embodiment, etc. assume a vehicle in which a driver seat is provided on the left side, while a passenger seat is provided on the right side. However, the present technique is applicable to a vehicle in which a driver seat is provided on the right side while a passenger seat is provided on the left side. In this case, the left and right may be appropriately reversed regarding the descriptions and drawings of the present embodiment.

Embodiment 2

FIGS. 11 and 12 are each schematic cross sectional views describing the internal configuration of an airbag 210 according to Embodiment 2. FIG. 11 illustrates a cross section in the horizontal direction, while FIG. 12 illustrates a cross section in the perpendicular direction. FIGS. 11 and 12 illustrate the flow of gas fed from the inflator 104 using arrows. FIG. 13 is an exploded view of the airbag 210 according to Embodiment 2. The airbag 210 according to Embodiment 2 is configured by combining two bags consisting of an inner bag 220 and an outer bag 230. The inner bag 220 and the outer bag 230 in the airbag 210 according to Embodiment 2 are configured as independent bags without sharing any panels. However, the appearance of the airbag 210 consisting of the combination of the inner bag 220 and the outer bag 230 is nearly the same as the appearance of the airbag 110 according to Embodiment 1.

The inner bag 220 of the airbag 210 is configured to include a central panel 218 with an occupant facing surface 219 provided therein, along with left and right side panels 212. The left and right side panels 212 of the inner bag 220 may have substantially the same configuration as that of the partition panels 112 of the airbag 110 according to Embodiment 1. A ventilation port 221 is formed in each of the left and right side panels 212. The configuration of the inner bag 220 may be substantially the same configuration as that of the inner bag 120 of the airbag 110 according to Embodiment 1.

The outer bag 230 of the airbag 210 is configured to include an outer central panel 232, along with a left panel 216a and a right panel 216b, as well as left and right inner surface panels 234 and an inner central panel 236 for configuring the inner surface. However, the airbag 210 according to Embodiment 2 may not have a panel corresponding to the coupling panel 133 possessed by the airbag 110 according to Embodiment 1.

The left and right inner surface panels 234 are panels configuring surfaces facing the side panels 212 of the inner bag 220. The inner surface panels 234 have a shape and size the same as or slightly larger than that of the side panels 212. Moreover, a tongue shaped part 234a configuring a portion of lobes 211 is provided in the inner surface panels 234. The tongue shaped part 234a of the inner surface panels 234 and a tongue shaped part 217 of the left panel 216a or the right panel 216b are coupled so as to configure two lobes 211 which are disposed on the left and right sides of the occupant facing surface 219 so as to protrude rearward. Moreover, in each inner surface panel 234, each ventilation port 235 is formed at a position facing the ventilation port 221 of the side panels 212 of the inner bag 220.

The inner central panel 236 is a belt shaped panel configuring a surface facing the central panel 218 of the inner bag 220. However, because the occupant facing surface 219 of the inner bag 220 is externally exposed, the inner central panel 236 of the outer bag 230 may face a part excluding the occupant facing surface 219 of the central panel 218 of the inner bag 220.

Left and right long side parts of the inner central panel 236 are coupled to each peripheral edge part of the left and right inner surface panels 234, while short side parts thereof are respectively coupled to short side parts of the outer central panel 232. Left and right long side parts of the outer central panel 232 are coupled to the peripheral edge part of the left panel 216a or the right panel 216b. Moreover, the tongue shaped part 217 of the left panel 216a and the right panel 216b and the tongue shaped part 234a of the left and right inner surface panels 234 are coupled so as to configure the two lobes 211. Note that the airbag 210 according to Embodiment 2 may or may not include a tether inside the outer bag 230 as in the airbag 110 according to Embodiment 1.

The inner bag 220 of the airbag 210 is stored inside the outer bag 230, that is, in the space surrounded by the inner central panel 236 and the left and right inner surface panels 234 of the outer bag 230. In this state, the ventilation port 221 of the side panels 212 of the inner bag 220 and the ventilation ports 235 of the inner surface panels 234 of the outer bag 230 are disposed so as to face each other, while the inner bag 220 and the outer bag 230 are coupled around the ventilation ports 221, 235. Moreover, the inner bag 220 and the outer bag 230 may be coupled around the occupant facing surface 219 of the central panel 218 of the inner bag 220.

A ventilation port connected to the inflator 104 is provided in the inner bag 220. Moreover, an external ventilation port 231 is formed in the left panel 216a of the outer bag 230. The inflator 104 feeds gas to the inner bag 220 of the airbag 210, but does not directly feed gas to the outer bag 230. The gas from the inflator 104 flows in the outer bag 230 from the inner bag 220 through the ventilation ports 221, 235, and is discharged outside the airbag 210 from the external ventilation port 231 of the outer bag 230. Therefore, the gas fed from the inflator 104 inflates and deploys the inner bag 220 of the airbag 210, in addition to inflating and deploying the outer bag 230.

The airbag 210 according to Embodiment 2 having the above configuration is configured such that the inner bag 220 and the outer bag 230 are provided as independent bags. The ventilation ports 221, 235 are respectively formed in the inner bag 220 and the outer bag 230, wherein the inner bag 220 and the outer bag 230 are coupled around this ventilation port. As a result, gas filled into the inner bag 220 can be flowed out to the outer bag 230. Moreover, the ventilation ports 221, 235 are respectively formed in left and right side faces of the inner bag 220, such that the gas filled into the inner bag 220 can be efficiently flowed out from the left and right ventilation ports 221, 235 to the outer bag 230.

Note that because other configurations of the airbag according to Embodiment 2 are the same as those of the airbag according to Embodiment 1, identical elements are labeled with identical labels, with detailed descriptions thereof omitted.

Embodiment 3

FIG. 14 is a schematic cross sectional view describing the internal configuration of an airbag 310 according to Embodiment 3. FIG. 15 is a schematic perspective view illustrating the appearance of the airbag 310 according to Embodiment 3. FIG. 16 is a schematic front view illustrating the appearance of the airbag 310 according to Embodiment 3. The airbag 310 according to Embodiment 3 is configured such that a pocket part 350 for housing a head 52 of a passenger 50 (when the airbag 310 is deployed) is provided.

The component configuration for the case in which the airbag 310 according to Embodiment 3 is exploded is substantially the same as the component configuration of the airbag 110 according to Embodiment 1 illustrated in FIG. 10. That is, the airbag 310 according to Embodiment 3 includes: a central panel 118 and two partition panels 112 which configure an inner bag 120; an outer central panel 132, a left panel 116a, and a right panel 116b which configure an outer bag 130; and a coupling panel 133 for coupling the central panel 118 and the outer bag 130. However, in order to provide the abovementioned pocket part 350, the size, shape, etc. of each component are appropriately adjusted.

The pocket part 350 of the airbag 310 according to Embodiment 3 is provided in an aspect such that the coupling part between the vicinity of the upper end of an exposed part 118a (occupant facing surface 119) of the central panel 118 and the coupling panel 133 along with the periphery thereof is recessed inside the airbag 310. The upper inner surface and left and right inner side faces of the pocket part 350 serve as a portion of the coupling panel 133, while the lower inner surface thereof serves as a portion of the central panel 118.

In the airbag 310 of according to Embodiment 3, the pocket part 350 is provided on the upper side of the occupant facing surface 119. When the airbag 310 is deployed such that the passenger 50 is constrained by the airbag, the pocket part 350 can allow deformation of the upper part of the central panel 118 towards the front side of a vehicle, decrease the rotational force in the retroflexion direction applied to the head of the passenger 50, and reduce damage to the head.

Note that because other configurations of the airbag according to Embodiment 3 are the same as those of the airbag according to Embodiment 1, identical elements are labeled with identical labels, with detailed descriptions thereof omitted.

It is to be presumed that while the embodiments disclosed herein are illustrative in all respects, they are not restrictive. It is intended that the scope of the present invention is not indicated by the abovementioned meaning, but by Scope of the Patent Claims, and includes all changes in the meaning and scope equivalent to the Scope of the Patent Claims.

REFERENCE NUMERALS

10 Vehicle
11 Dashboard
12 Front glass
14 Roof
20 Side door
40 Seat
50 Passenger
52 Head
54 Body shoulder
100 Airbag assembly
102 Housing
104 Inflator
110 Airbag
111 Lobe (protrusion part)
112 Partition panel (partition wall)
116a Left panel (outer panel)
116b Right panel (outer panel)
118 Central panel
118a Exposed part
119 Occupant facing surface
120 Inner bag
121 Ventilation port
130 Outer bag
131 External ventilation port (second ventilation port)
132 Outer central panel
133 Coupling panel (intermediate panel)
134 Ventilation port
140 Tether (internal tether)
210 Airbag
211 Lobe (protrusion part)
212 Side panel
216a Left panel
216b Right panel
218 Central panel
219 Occupant facing surface
220 Inner bag
221 Ventilation port
230 Outer bag
231 External ventilation port (second ventilation port)
232 Outer central panel
234 Inner surface panel
235 Ventilation port
236 Inner central panel
310 Airbag
350 Pocket part

The invention claimed is:

1. An airbag, comprising:
an inner bag having a facing surface configured to face a passenger of a vehicle in a deployed state;
an outer bag which is provided so as to surround an outer periphery of the inner bag with the facing surface exposed, wherein the outer bag surrounds upper, lower, left, and right surfaces of the inner bag;
two protrusion parts which are provided in the outer bag and respectively disposed on left and right sides in a width direction of the vehicle with respect to the facing surface so as to protrude rearward; and
a pocket part configured to receive a deformation of the inner bag in response to an impact of a head of the passenger on the facing surface of the inner bag, the pocket part provided such that an upper part of an exposed part of the inner bag along with a peripheral part of the upper part thereof is recessed,
wherein the pocket part extends laterally along the upper part of the exposed part of the inner bag,
wherein the pocket part is disposed between upper portions of the two protrusion parts,
wherein a coupling part of the pocket part is formed between the upper part of the exposed part of the inner bag and an upper portion of an intermediate panel of the outer bag, the coupling part being recessed inside the airbag such that the upper portion of the intermediate panel of the outer bag protrudes rearward above the pocket part, and wherein the two protrusion parts are configured to deploy directly above shoulders of the passenger and adjacent to opposing sides of the head of the passenger.

2. The airbag according to claim 1, wherein the inner bag and the outer bag are partitioned by a common partition wall, and wherein a ventilation port is formed in the partition wall.

3. The airbag according to claim 2, wherein the outer bag includes:

left and right outer panels configuring left and right outer surfaces along with a portion of the protrusion parts; and wherein the intermediate panel is provided between the partition wall and one of the left and right outer panels so as to configure a part different from the portion of the protrusion parts.

4. The airbag according to claim 3, wherein the intermediate panel is provided so as to surround the exposed part which exposes at least a portion of the facing surface of the inner bag.

5. The airbag according to claim 3, comprising an internal tether which is connected to the partition wall and an inner surface of one of the left and right outer panels and bridged in a lateral direction inside the outer bag.

6. The airbag according to claim 2, wherein the outer bag includes:

left and right outer panels configuring left and right outer surfaces along with a portion of the protrusion parts; and wherein the intermediate panel is provided between the inner bag and one of the left and right outer panels so as to configure a part different from the portion of the protrusion parts.

7. The airbag according to claim 6, wherein the intermediate panel is provided so as to surround the exposed part which exposes at least a portion of the facing surface of the inner bag.

8. The airbag according to claim 6, comprising an internal tether which is connected to the partition wall and an inner surface of one of the left and right outer panels and bridged in a lateral direction inside the outer bag.

9. The airbag according to claim 2, wherein, when the airbag is inflated, gas is fed from an inflator to the inner bag and from the inner bag to the outer bag through the ventilation port.

10. The airbag according to claim 1, wherein the inner bag and the outer bag are each independent bag bodies, wherein a ventilation port is formed in each of the inner bag and the outer bag, and wherein the inner bag and the outer bag are coupled around the ventilation ports.

11. The airbag according to claim 10, wherein the ventilation port is formed in left and right side faces of the inner bag.

12. The airbag according to claim 10, wherein, when the airbag is inflated, gas is fed from an inflator to the inner bag and from the inner bag to the outer bag through the ventilation ports.

13. The airbag according to claim 1, wherein a second ventilation port communicating with an inside and outside of the outer bag is formed in at least one of left and right outer surfaces of the outer bag.

* * * * *